United States Patent
O'Mahony et al.

(10) Patent No.: US 12,458,482 B2
(45) Date of Patent: Nov. 4, 2025

(54) ASSEMBLIES INCLUDING A PRE-LOADED IMPLANT AND METHODS OF STERILIZING ASSEMBLIES

(71) Applicant: Medtronic, Inc., Minneapolis, MN (US)

(72) Inventors: John Patrick O'Mahony, Clare (IE); Robert Mac Carthy, Irvine, CA (US); Ciara Haren, Santa Rosa, CA (US); Theresa Ann McDonagh, Spiddal (IE); Miriam Burke, Claregalway (IE); Christopher Faherty, Inis Mor (IE); Jeffrey Barnell, Santa Rosa, CA (US)

(73) Assignee: MEDTRONIC, INC., Minneapolis, MN (US)

( * ) Notice: Subject to any disclaimer, the term of this patent is extended or adjusted under 35 U.S.C. 154(b) by 537 days.

(21) Appl. No.: 17/925,295

(22) PCT Filed: May 11, 2021

(86) PCT No.: PCT/US2021/031739
§ 371 (c)(1),
(2) Date: Nov. 14, 2022

(87) PCT Pub. No.: WO2021/242514
PCT Pub. Date: Dec. 2, 2021

(65) Prior Publication Data
US 2023/0218381 A1    Jul. 13, 2023

Related U.S. Application Data

(60) Provisional application No. 63/031,980, filed on May 29, 2020.

(51) Int. Cl.
*A61L 2/18* (2006.01)
*A61F 2/00* (2006.01)
(Continued)

(52) U.S. Cl.
CPC .......... *A61F 2/0095* (2013.01); *A61F 2/2427* (2013.01); *A61L 2/18* (2013.01);
(Continued)

(58) Field of Classification Search
USPC ......................................................... 623/2.11
See application file for complete search history.

(56) References Cited

U.S. PATENT DOCUMENTS 5,720,391 A    2/1998  Dohm et al.
7,712,606 B2 *  5/2010  Salahieh ............... A61F 2/2427
                                                206/370
(Continued)

FOREIGN PATENT DOCUMENTS

| | | |
|---|---|---|
| CN | 110621591 A | 12/2019 |
| EP | 2780042 B1 | 3/2016 |
| EP | 2542184 | 5/2016 |

OTHER PUBLICATIONS

International Search Report mailed Sep. 17, 2021 in International Application No. PCT/US2021/031739.

*Primary Examiner* — Tan-Uyen T Ho
(74) *Attorney, Agent, or Firm* — Wentsler LLC

(57) ABSTRACT

Aspects of the disclosure relate to storage assemblies including at least part of a delivery device and an implant. The storage assemblies are configured to trap sterilizing ethylene oxide gas using its high water solubility and converting the escaped ethylene oxide to less detrimental ethylene glycol and ethylene chlorohydrin to protect the implant from damage. In one example, the storage assembly includes an inner container housing the implant and sterilizing fluid and an outer container positioned over the inner container, wherein the outer container is at least partially filled with aqueous water. The implant may be a prosthetic heart valve. Aspects
(Continued)

of the disclosure also relate to methods of sterilizing the storage assemblies of the disclosure.

16 Claims, 3 Drawing Sheets

(51) Int. Cl.
*A61F 2/24* (2006.01)
*A61L 2/20* (2006.01)
*A61L 2/26* (2006.01)
*A61L 101/44* (2006.01)

(52) U.S. Cl.
CPC ............... *A61L 2/206* (2013.01); *A61L 2/26* (2013.01); *A61L 2101/44* (2020.08); *A61L 2202/15* (2013.01); *A61L 2202/182* (2013.01); *A61L 2202/24* (2013.01)

(56) References Cited

U.S. PATENT DOCUMENTS

| | | |
|---|---|---|
| 9,498,317 B2 | 11/2016 | Gautam et al. |
| 10,370,150 B2 | 8/2019 | Salahieh et al. |
| 2007/0061008 A1 | 3/2007 | Salahieh et al. |
| 2011/0301700 A1 | 12/2011 | Fish et al. |
| 2018/0318061 A1 | 11/2018 | Clarke et al. |
| 2019/0152651 A1 | 5/2019 | Salahieh et al. |
| 2019/0336262 A1 | 11/2019 | Duffy et al. |

\* cited by examiner

ASSEMBLIES INCLUDING A PRE-LOADED IMPLANT AND METHODS OF STERILIZING ASSEMBLIES

CROSS-REFERENCE TO RELATED APPLICATIONS

This is the National Stage under 35 U.S.C. § 371 of International Application No. PCT/US2021/031739, filed May 11, 2021, which claims the benefit of U.S. Provisional Patent Application No. 63/031,980, filed May 29, 2020, the entire content of which is incorporated herein by reference.

FIELD

The present technology is generally related to storage assemblies and methods for sterilizing storage assemblies including at least a portion of a transcatheter delivery device having an implant loaded thereon. In various examples, the storage assembly is sterilized at least in part with a water soluble sterilant gas such as ethylene oxide gas.

BACKGROUND

A human heart includes four heart valves that determine the pathway of blood flow through the heart: the mitral valve, the tricuspid valve, the aortic valve, and the pulmonary valve. The mitral and tricuspid valves are atrio-ventricular valves, which are located between the atria and the ventricles, while the aortic and pulmonary valves are semilunar valves, which are located between the ventricles and the arteries leaving the heart. Ideally, native leaflets of a heart valve move apart from each other when the valve is in an open position, and meet or "coapt" when the valve is in a closed position. Problems that may develop with valves include stenosis in which a valve does not open properly, and/or insufficiency or regurgitation in which a valve does not close properly. Stenosis and insufficiency may occur concomitantly in the same valve. The effects of valvular dysfunction vary, with regurgitation or backflow typically having relatively severe physiological consequences to the patient.

Diseased or otherwise deficient heart valves can be repaired or replaced using a variety of different types of heart valve surgeries. One conventional technique involves an open-heart surgical approach that is conducted under general anesthesia, during which the heart is stopped and blood flow is controlled by a heart-lung bypass machine.

More recently, minimally invasive approaches have been developed to facilitate catheter-based implantation of the valve prosthesis on the beating heart, intending to obviate the need for the use of classical sternotomy and cardiopulmonary bypass. In general terms, an expandable valve prosthesis is compressed about or within a catheter of a delivery device, inserted inside a body lumen of the patient, such as the femoral artery, and delivered to a desired location in the heart where the valve prosthesis is then deployed.

Known valve prostheses include a stent frame supporting a valve structure. The valve structure can assume a variety of forms, and can be formed, for example, from tissue made from one or more biocompatible synthetic materials, synthetic polymers, autograft tissue, homograft tissue, xenograft tissue, or one or more other suitable materials. In some embodiments, the valve structure can be formed, for example, from bovine, porcine, equine, ovine and/or other suitable animal tissues. The valve structure can be formed from heart valve tissue, pericardium, and/or other suitable tissue. In some embodiments, the valve structure can include or form one or more leaflets. For example, the valve structure can be in the form of a tri-leaflet bovine pericardium valve, a bi-leaflet valve, or another suitable valve.

A valve prosthesis is often packaged in a container filled with solution, such as glutaraldehyde solution, for sterilizing and preserving the valve prosthesis prior to attachment to a delivery device for delivery to a patient. Such a method is generally referred to as a "wet" stored valve. Sometimes, the valve prosthesis is preloaded on a distal portion of the delivery device, which are both packaged in the container. Some known packaging configurations include both wet and dry compartments: wherein the valve prosthesis is stored in a wet compartment loaded onto the delivery device component and the remainder of the delivery device component is secured in a dry compartment.

Ethylene oxide gas is a very effective gas for sterilizing medical devices due to its high potency and ability to penetrate very deeply into products, down low lumens and through seals. That said, ethylene oxide gas is known to be very detrimental to wet valve tissue of prosthetic heart valves. The present disclosures addresses problems and limitations associated with devices and methods of utilizing ethylene oxide gas for sterilizing devices including prosthetic valves.

SUMMARY

The techniques of this disclosure generally relate to storage assemblies and methods for sterilizing storage assemblies including at least a portion of a transcatheter delivery device on which an implant is a pre-attached. Ethylene oxide gas is a very effective gas for sterilizing medical devices due to its high potency and ability to penetrate very deeply into products, down through lumens and seals. This penetrability presents a problem when trying to sterilize a prosthetic heart valve that is in a liquid sterilization medium such as a glutaraldehyde solution, as the vessel seals can be compromised allowing ethylene oxide gas to penetrate into the valve container where the ethylene oxide gas will dissolve in the sterilization medium. Ethylene oxide gas is very detrimental to wet stored prosthetic valve tissue. It has also been shown that ethylene chlorohydrin and ethylene glycol are formed on reaction with water and the commonly used BBG buffer solution used to stabilize glutaraldehyde. These cannot be removed by standard ethylene oxide vacuum processing and will remain in contact with valve tissue for up to two years. The effects of chemical exposure over this period of time is unknown and is believed to pose a significant risk to the valve tissue. Aspects of the disclosure relate to devices and methods to trap ethylene oxide gas using its high water solubility and converting the escaped ethylene oxide to less detrimental ethylene glycol and ethylene chlorohydrin.

In one aspect, the present disclosure provides a storage assembly comprising a delivery device including a shaft having an implant loaded thereto. The storage assembly further includes an inner container surrounding the implant and sealed to the shaft and containing sterilizing fluid. The storage assembly also including an outer container surrounding the inner container and sealed to the shaft. The outer container contains aqueous water.

In another aspect, the disclosure provides a method of sterilizing an assembly. The method comprises providing storage assembly including a delivery device having a shaft with an implant loaded thereto and an inner container surrounding the implant and fluidly sealed to the shaft. The inner container contains sterilizing fluid. The storage assembly further includes an outer container surrounding the inner container and fluidly sealed to the shaft and the outer container contains aqueous water. The method further comprises sterilizing the storage assembly with ethylene oxide gas and converting at least a portion of the ethylene oxide gas into ethylene glycol and ethylene chlorohydrin when the portion of ethylene oxide gas contacts the aqueous water.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Aspects of the disclosure allow a pre-mounted transcatheter delivery device supporting an implant to be sterilized using ethylene oxide gas without risking damage to the implant. As referred to herein, implants useful with and/or as part of the various assemblies, devices and methods of the present disclosure may assume a wide variety of different configurations, such as a stented transcatheter prosthetic heart valves including a bioprosthetic heart valve having tissue leaflets or a synthetic heart valve having polymeric, metallic or tissue-engineered leaflets, and can be specifically configured for replacing any of the four valves of the human heart. Thus, the stented prosthetic heart valves useful with the systems, devices, and methods of the present disclosure can be generally used for replacement of a native aortic, mitral, pulmonic or tricuspid valve, or to replace a failed bioprosthesis, such as in the area of an aortic valve or mitral valve, for example.

In general terms, the stented prosthetic heart valves of the present disclosure include a stent or stent frame having an internal lumen maintaining a valve structure (tissue or synthetic), with the stent frame having a normal, expanded condition or arrangement and collapsible to a compressed condition or arrangement for loading within a delivery device. The stent frame is normally constructed to self-deploy or self-expand when released from the delivery device. For example, the stents or stent frames are support structures that comprise a number of struts or wire segments arranged relative to each other to provide a desired compressibility and strength to the prosthetic heart valve. The struts or wire segments are arranged such that they are capable of self-transitioning from a compressed or collapsed condition to a normal, radially expanded condition. The struts or wire segments can be formed from a shape memory material, such as a nickel titanium alloy (e.g., nitinol). The stent frame can be laser-cut from a single piece of material, or can be assembled from a number of discrete components.

Figure 1A:
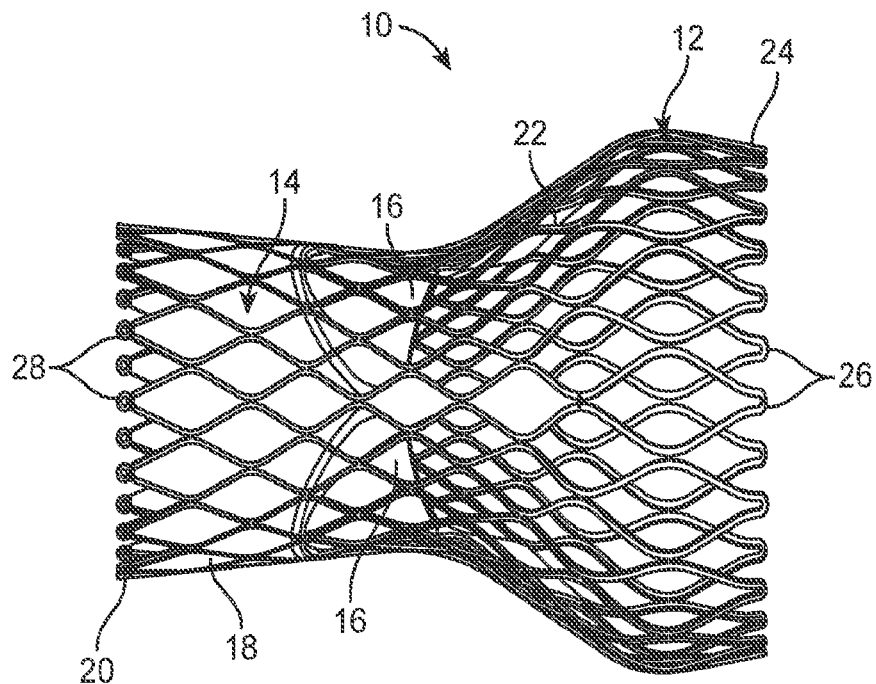
FIG. 1A is a side view of a stented prosthetic heart valve useful with assemblies, devices and methods of the present disclosure and in a normal, expanded condition.
Figure 1B:
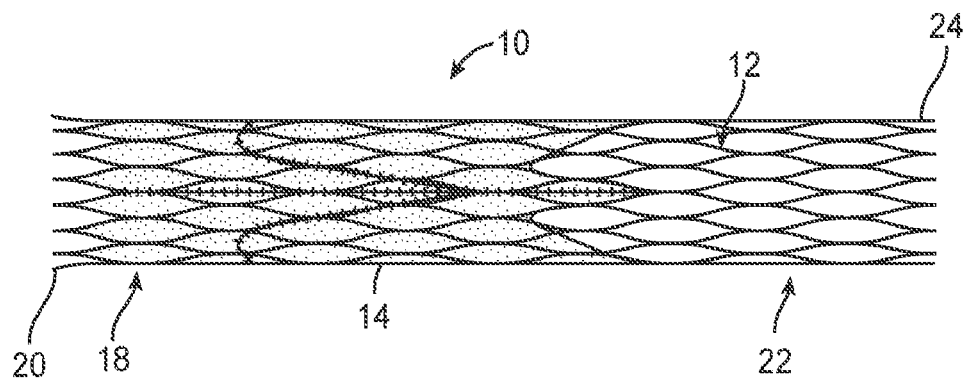
FIG. 1B is a side view of the prosthetic heart valve of FIG. 1A in a compressed condition.

With the above understanding in mind, one simplified, non-limiting example of an implant 10, a stented prosthetic heart valve, useful with systems, devices and methods of the present disclosure is illustrated in FIGS. 1A-1B. As a point of reference, the prosthetic heart valve 10 is shown in a normal or expanded condition in the view of FIG. 1A; FIG. 1B illustrates the prosthetic heart valve in a compressed condition (e.g., when compressively retained within an outer catheter or sheath as described below). The prosthetic heart valve 10 includes a stent or stent frame 12 and a valve structure 14. A paravalvular leakage prevention wrap (not shown) can optionally be provided around the stent frame 12. The stent frame 12 can assume any of the forms mentioned above, and is generally constructed so as to be self-expandable, balloon-expandable, and/or mechanically expandable from the compressed condition (FIG. 1B) to the normal, expanded condition (FIG. 1A). In some embodiments, the stent frame can be self-expandable, balloon expandable or mechanically expandable or combinations thereof.

The valve structure 14 can assume a variety of forms, and can be formed, for example, from one or more biocompatible synthetic materials, synthetic polymers, autograft tissue, homograft tissue, xenograft tissue, or one or more other suitable materials. In some embodiments, the valve structure 14 can be formed, for example, from bovine, porcine, equine, ovine and/or other suitable animal tissues. In some embodiments, the valve structure 14 can be formed, for example, from heart valve tissue, pericardium, and/or other suitable tissue. In some embodiments, the valve structure 14 can include or form one or more leaflets 16. For example, the valve structure 14 can be in the form of a tri-leaflet valve, a bi-leaflet valve, or another suitable valve. In some constructions, the valve structure 14 can comprise two or three leaflets that are fastened together at enlarged lateral end regions to form commissural joints, with the unattached edges forming coaptation edges of the valve structure 14. The leaflets 16 can be fastened to a skirt that in turn is attached to the frame 12. The upper ends of the commissure points can define an inflow portion 18 corresponding to a first or inflow end 20 of the prosthetic heart valve 10. The opposite end of the valve can define an outflow portion 22 corresponding to a second or outflow end 24 of the prosthetic heart valve 10. As shown, the stent frame 12 can have a lattice or cell-like structure, and optionally forms or provides crowns 26 and/or eyelets 28 (or other shapes) at the outflow and inflow ends 20, 24.

With the one exemplary construction of FIGS. 1A and 1B; the prosthetic heart valve 10 can be configured (e.g., sized and shaped) for replacing or repairing an aortic valve. Alternatively, other shapes are also envisioned, adapted to mimic the specific anatomy of the valve to be repaired (e.g., stented prosthetic heart valves useful with the present disclosure can alternatively be shaped and/or sized for replacing a native mitral, pulmonic or tricuspid valve or compassionate use such as heterotopic implants).

Figure 2A:
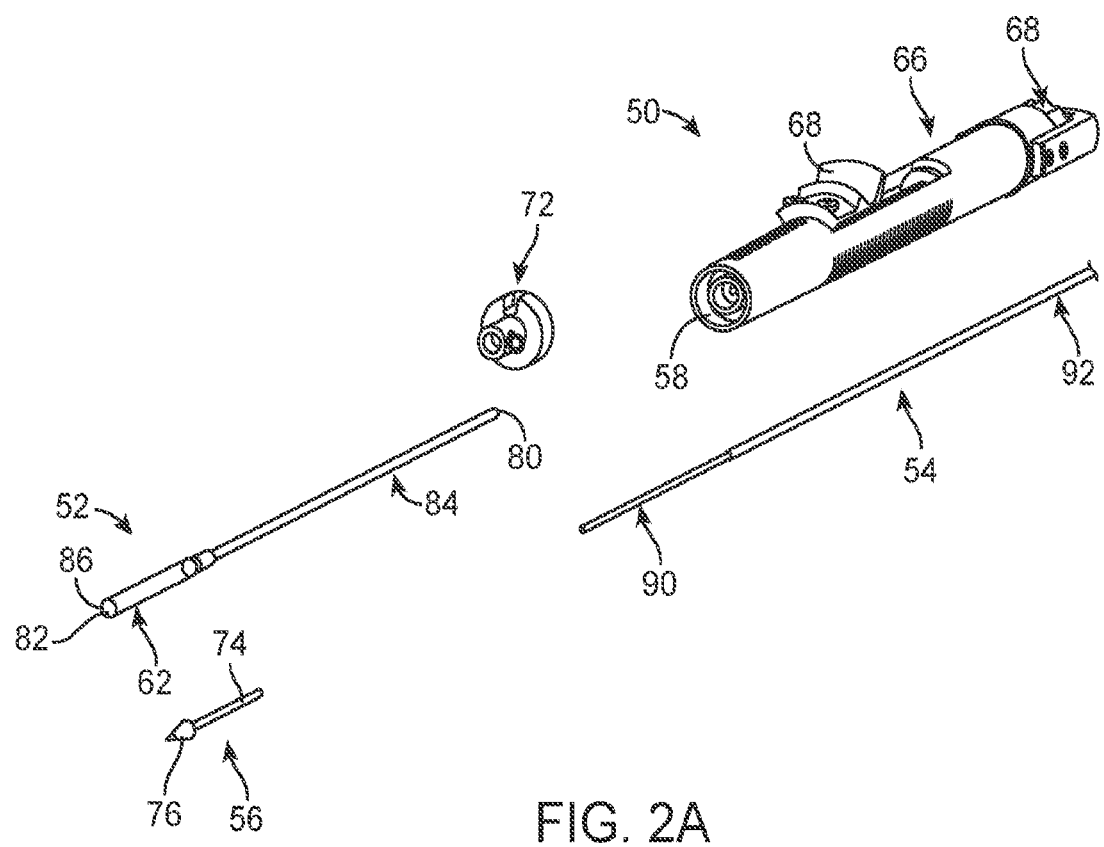
FIG. 2A is an exploded perspective view of a delivery device in accordance with principles of the present disclosure.
Figure 2B:
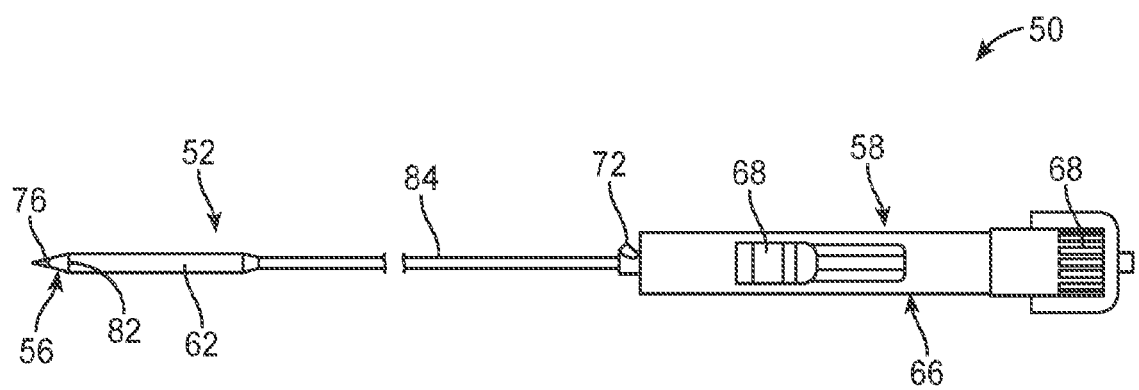
FIG. 2B is an assembled top view of the delivery device of FIG. 2A.

With the above understanding of some example implant valves in mind, one embodiment of a delivery device 50 for percutaneously delivering a self-expanding implant is shown in simplified form in FIGS. 2A and 2B. The delivery device 50 includes an optional delivery sheath assembly 52, a shaft assembly 54 having a valve retention member or spindle 56 and a handle assembly 58. Details on the various components are provided below. In general terms, however, the delivery device 50 combines with an implant (e.g., the prosthetic heart valve of FIGS. 1A-1B) to form a system for performing a therapeutic procedure. The delivery device 50 provides a loaded or delivery state in which the implant is loaded over the spindle 56 and is compressively retained within a capsule 62 of the delivery sheath assembly 52. The delivery sheath assembly 52 can be manipulated to withdraw the capsule 62 proximally from over the prosthetic heart valve via operation of the handle assembly 58, permitting the prosthetic heart valve to self-expand and partially release from the spindle 56. When the capsule 62 is retracted proximally, the implant can completely release or deploy from the delivery device 50. The delivery device 50 can optionally include other components that assist or facilitate or control complete deployment of the implant, as desired.

Various features of the components 52-58 reflected in FIGS. 2A and 2B and as described below can be modified or replaced with differing structures and/or mechanisms. Thus, the present disclosure is in no way limited to the delivery sheath assembly 52, the shaft assembly 54 or the handle assembly 58 as shown and described below. Further, the delivery device 50 can optionally include additional components or features, such as a flush port assembly 72, a recapture sheath (not shown), etc.

In some embodiments, the optional delivery sheath assembly 52 defines proximal and distal ends 80, 82, and includes the capsule 62 and an outer shaft 84. The delivery sheath assembly 52 can be akin to a catheter, defining a lumen 86 (referenced generally) that extends from the distal end 82 through the capsule 62 and at least a portion of the outer shaft 84. The lumen 86 can be open at the proximal end 80 (e.g., the outer shaft 84 can be a tube). The capsule 62 extends distally from the outer shaft 84, and in some embodiments has a more stiffened construction (as compared to a stiffness of the outer shaft 84) that exhibits sufficient radial or circumferential rigidity to overtly resist the expected expansive forces of the implant (not shown) when compressed within the capsule 62. For example, the outer shaft 84 can be a polymer tube embedded with a metal braiding, whereas the capsule 62 includes a laser-cut metal tube that is optionally embedded within a polymer covering. Alternatively, the capsule 62 and the outer shaft 84 can have a more uniform or even homogenous construction (e.g., a continuous polymer tube). Regardless, the capsule 62 is constructed to compressively retain the stented prosthetic heart valve at a predetermined diameter when loaded within the capsule 62, and the outer shaft 84 serves to connect the capsule 62 with the handle assembly 58. The outer shaft 84 (as well as the capsule 62) is constructed to be sufficiently flexible for passage through a patient's vasculature, yet exhibits sufficient longitudinal rigidity to effectuate desired axial movement of the capsule 62. In other words, proximal retraction of the outer shaft 84 is directly transferred to the capsule 62 and causes a corresponding proximal retraction of the capsule 62. In other embodiments, the outer shaft 84 is further configured to transmit a rotational force or movement onto the capsule 62.

The shaft assembly 54 can have various constructions appropriate for supporting the delivery sheath assembly 52 and an implant relative to the capsule 62. In some embodiments, the inner shaft assembly 54 includes an intermediate shaft or tube 90 and a proximal shaft or tube 92. The intermediate tube 90 is optionally formed of a flexible polymer material (e.g., PEEK), and is sized to be slidably received within the delivery sheath assembly 52. The intermediate tube 90 serves as a transition to the deflection assembly 60, and in some embodiments is a flexible polymer tubing (e.g., PEEK) having a diameter slightly less than that of the proximal tube 92. The proximal tube 92 can have a more rigid construction, configured for robust assembly with the handle assembly 58, such as a metal hypotube. Other constructions are also envisioned. For example, in other embodiments, the intermediate and proximal tubes 90, 92 are integrally formed as a single, homogenous tube or shaft. Regardless, the inner shaft assembly 54 forms or defines at least one lumen (not shown) sized, for example, to slidably receive a guide wire (not shown).

The spindle 56 of the inner shaft assembly 54 includes an inner support shaft 74 and a tip 76. The inner support shaft 74 is sized to be slidably received within the lumen 86 of the delivery sheath assembly 52, and is configured for mounting to the deflection assembly 60. The inner support shaft 74 can be a flexible polymer tube embedded with a metal braid. Other constructions are also acceptable so long as the inner support shaft 74 exhibits sufficient structural integrity to support a loaded, compressed stented prosthetic heart valve (not shown). The tip 76 forms or defines a nose cone having a distally tapering outer surface adapted to promote atraumatic contact with bodily tissue. The tip 76 can be fixed or slidable relative to the inner support shaft 74. The spindle 56 can define a continuous lumen (not shown) sized to slidably receive an auxiliary component such as a guide wire (not shown).

The handle assembly 58 generally includes a housing 66 and one or more actuator mechanisms 68 (referenced generally). The housing 66 maintains the actuator mechanism(s) 68, with the handle assembly 58 configured to facilitate sliding movement of the delivery sheath assembly 52 relative to other components (e.g., the inner shaft assembly 54, the spindle 56. The housing 66 can have any shape or size appropriate for convenient handling by a user.

With the above general explanations of exemplary embodiments of the components of the delivery device 50 in mind, the present disclosure provides many assemblies for storing implants in a "wet" (generally submerged within sterilization fluid) state with at least a portion of a delivery device (e.g., an inner shaft assembly or spindle of a delivery, device such as the delivery device 50). The disclosed embodiments are configured to allow for sterilization of the implant and portions of the delivery device included in the storage assembly. In the embodiments disclosed herein, the implants can either be stored in either an expanded or a compressed condition.

Figure 3:
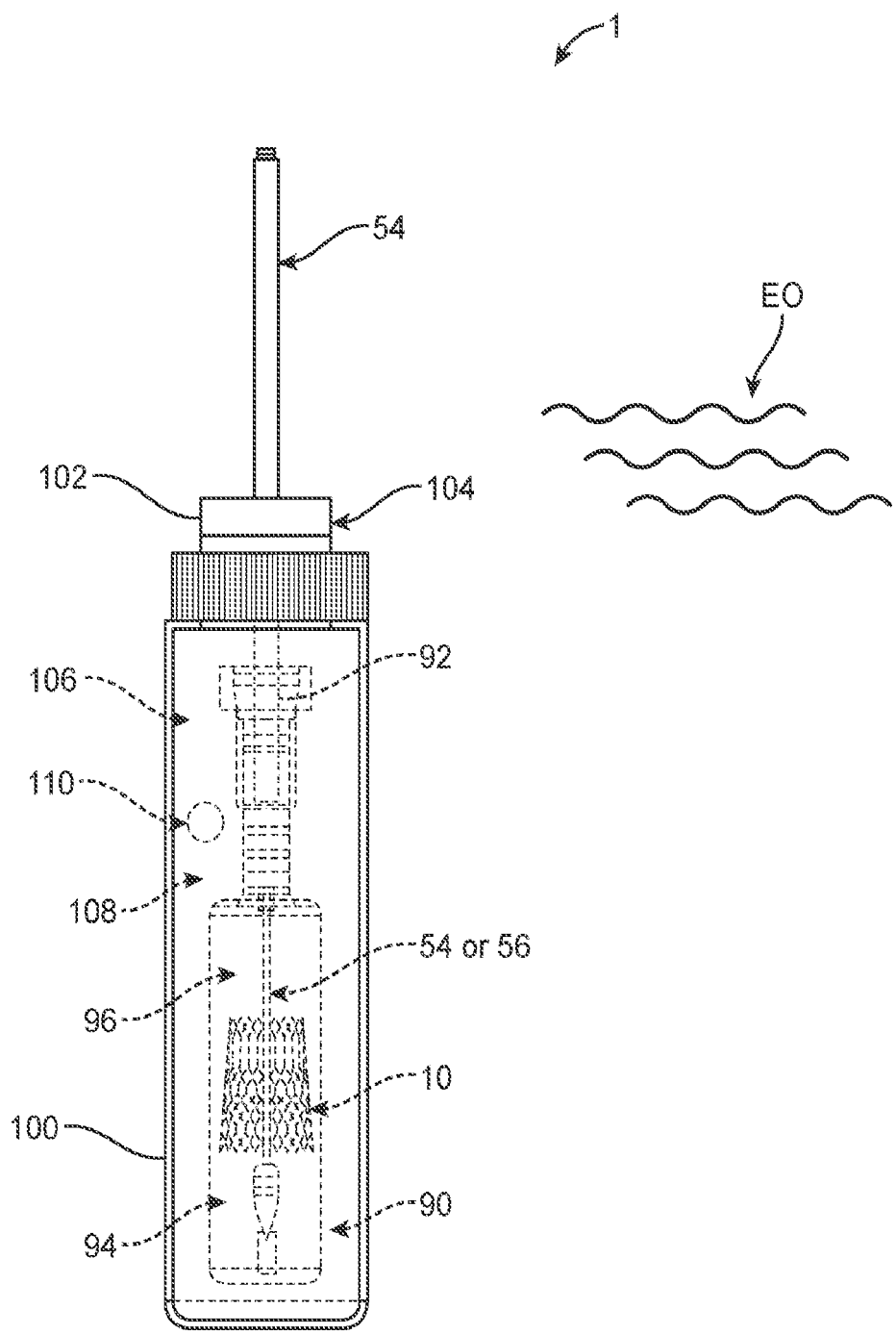
FIG. 3 is a schematic diagram of a storage assembly.

When preloading an implant to a delivery device for storage prior to use, it is often desired to store the implant "wet" (i.e. with sterilization fluid such as a glutaraldehyde BBG solution). One embodiment of a storage assembly 1 for wet storage of an implant is shown in FIG. 3. The storage assembly 1 includes the implant 10 preloaded onto the shaft assembly 54 of the delivery device 50. It will be understood that the implant 10 and delivery device 50 are merely provided as examples that that the disclosure is not intended to be limited to any specific implant or delivery device. Further, in this embodiment, the implant 10 is loaded onto and packaged with only select portions of the complete delivery device 50 as not all of the delivery device 50 is required as part of the storage assembly 1. In one example, the handle assembly 58 or other, perhaps reusable, components of the delivery device 50 are omitted and put together prior to use.

In the example of FIG. 3, the storage assembly 1 includes the delivery device 50 including a shaft 54 having the prosthetic heart valve 10 loaded thereto. It is to be understood that the shaft 54 can be a continuous member or can optionally include separate spindle 56. The storage assembly 1 further includes an inner container 90 surrounding the prosthetic heart valve 10 and sealed to the shaft 54. In one example, the inner container 90 is made of a flexible polymer. The inner container 90 is sealed to the shaft 54 with a fluid tight seal 92, such as a silicone seal, so that sterilization fluid 94 (generally referenced) located within an interior compartment 96 the inner container 90 is maintained therein. In one example, the sterilization fluid 94 includes glutaraldehyde and a buffer (e.g., BBG) in solution.

The storage assembly 1 also includes an outer container 100 surrounding the inner container 90 and sealed to the shaft with a fluid tight seal 104, such as a silicone seal. In one example, the seal 104 may be part of a cap 102. The outer container 100 contains aqueous water 106 (generally referenced). The aqueous water 106 may include up to 100% of purified water or distilled water, for example. The outer container 100 is filled with a sufficient amount of aqueous water 106 so that during a sterilization process including ethylene oxide gas EO (schematically represented), any ethylene oxide gas EO that escapes past the seal 104 between the shaft 54 and the outer container 100 must pass through the water 106 before it can potentially pass through the seal 92 between the shaft 54 and the inner container 90 where the ethylene oxide gas EO could damage the prosthetic heart valve 10. In one embodiment, there is a sufficient amount of aqueous water to cover the inner container and the first seal regardless of how the storage assembly is oriented. The chemical by-products of ethylene oxide gas EO reacting with water (e.g., water 106) include ethylene glycol and ethylene chlorohyrin. In various embodiments, the outer container 100 can additionally include activated carbon 110, which can absorb ethylene glycol and ethylene chlorohyrin, which may be generated during the ethylene oxide gas sterilization. For example, the activated carbon 110 can be provided in a strip or pill that is positioned within the interior 108 of the outer container 100. It is believed, but not relied upon, that the reaction of ethylene oxide gas EU into ethylene glycol and ethylene chorohyrin can be accelerated by acidifying the water 106. For example, the water 106 can be acidified with citric acid or the like.

Various methods of the disclosure can first include providing the storage assembly 1 of the disclosure, which includes at least a portion of a delivery device. In one example, the provided portions of delivery device 50 include the shaft 54 (optionally including spindle 56) having the implant or prosthetic valve 10 loaded thereto. The storage assembly 1 having the inner container 90 surrounding the implant 10 and sealed to the shaft 54/56 and the inner container 90 containing sterilizing fluid 96. The storage assembly 1 also including the outer container 100 surrounding the inner container 90 and sealed to the shaft 54/56. The outer container 100 contains aqueous water 106. The method further includes sterilizing the storage assembly 1 with ethylene oxide gas EO in any known manner 204. If any ethylene oxide EO gas breaches the seal 104, the ethylene oxide gas EO will contact the aqueous water 106 and react to form ethylene glycol and ethylene chlorohydrin. In some methods of the disclosure, the outer container 100 also contains activated carbon 110 provided in the interior 108 and the method further includes the activated carbon 110 absorbing at least a portion of any present ethylene glycol and ethylene chlorohydrin 206 within the interior 108.

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the techniques). In addition, while certain aspects of this disclosure are described as being performed by a single module or unit for purposes of clarity, it should be understood that the techniques of this disclosure may be performed by a combination of units or modules associated with, for example, a medical device.

What is claimed is:

1. A storage assembly comprising:
    a delivery device including a shaft having an implant loaded thereto;
    an inner container surrounding the implant and sealed to the shaft; wherein the inner container contains sterilizing fluid; and
    an outer container surrounding the inner container and sealed to the shaft; wherein the outer container contains aqueous water.

2. The storage assembly of claim 1, wherein the outer container contains activated carbon.

3. The storage assembly of claim 1, wherein the implant is a prosthetic heart valve.

4. The storage assembly of claim 1, wherein the inner container is sealed to the shaft with a first seal; wherein there is a sufficient amount of aqueous water to cover the inner container and the first seal.

5. The storage assembly of claim 4, wherein there is a sufficient amount of aqueous water to cover the inner container and the first seal regardless of how the storage assembly is oriented.

6. The storage assembly of claim 1, wherein the aqueous water is selected from the group consisting of purified water and distilled water.

7. The storage assembly of claim 1, wherein the sterilizing fluid contains glutaraldehyde.

8. The storage assembly of claim 7, wherein the sterilizing fluid includes a buffer solution.

9. A method of sterilizing an assembly, the method comprising;
    providing storage assembly including:
    a delivery device having:
    a shaft having an implant loaded thereto;
        an inner container surrounding the implant and fluidly sealed to the shaft; wherein the inner container contains sterilizing fluid; and
        an outer container surrounding the inner container and fluidly sealed to the shaft; wherein the outer container contains aqueous water;
    sterilizing the storage assembly with ethylene oxide gas; and
    converting at least a portion of the ethylene oxide gas into ethylene glycol and ethylene chlorohydrin when the portion of ethylene oxide gas contacts the aqueous water.

10. The method of claim 9, wherein the outer container also contains activated carbon and the method further includes the activated carbon absorbing at least a portion of the ethylene glycol and ethylene chlorohydrin.

11. The method of claim 9, wherein the inner container is sealed to the shaft with a first seal; wherein there is a sufficient amount of aqueous water to cover the inner container and the first seal.

12. The method of claim 11, wherein there is a sufficient amount of aqueous water to cover the inner container and the first seal regardless of how the storage assembly is oriented.

13. The method of claim 9, wherein the aqueous water is selected from the group consisting of deionized water and distilled water.

14. The method of claim 9, wherein the sterilizing fluid contains glutaraldehyde.

15. The method of claim 14, wherein the sterilizing fluid includes a buffer solution.

16. The method of claim 9, wherein the implant is a prosthetic heart valve.

\* \* \* \* \*